US012664240B2

(12) United States Patent
Sayyed et al.

(10) Patent No.: US 12,664,240 B2
(45) Date of Patent: Jun. 23, 2026

(54) BIOS METHOD FOR SECURING AND PROTECTING END POINT WITH OWNERSHIP INFORMATION

(71) Applicant: Dell Products L.P., Round Rock, TX (US)

(72) Inventors: Ibrahim Sayyed, Georgetown, TX (US); Charles D. Robison, Buford, GA (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 18/461,580

(22) Filed: Sep. 6, 2023

(65) Prior Publication Data

US 2025/0077632 A1    Mar. 6, 2025

(51) Int. Cl.
*G06F 21/31* (2013.01)

(52) U.S. Cl.
CPC .................................. *G06F 21/31* (2013.01)

(58) Field of Classification Search
CPC ........ G06F 21/57; G06F 21/572; G06F 21/31; G06F 21/33
See application file for complete search history.

(56) References Cited

U.S. PATENT DOCUMENTS 8,788,681 B1 *   7/2014   MacKay ............. H04L 63/0823
                                                                709/228
8,893,154 B2 *   11/2014   Lin ............................ G06F 9/54
                                                                719/315

10,880,099 B2 *   12/2020   Kumar Ujjwal ...... G06F 21/577
11,822,669 B2 *   11/2023   Khatri ...................... G06F 21/33
2001/0007117 A1 *   7/2001   Cooper ................. G06F 9/4812
                                                                710/305

(Continued)

OTHER PUBLICATIONS

L. Z. Cai and M. F. Zuhairi, "Security challenges for open embedded systems," 2017 International Conference on Engineering Technology and Technopreneurship (ICE2T), Kuala Lumpur, Malaysia, 2017, pp. 1-6. (Year: 2017).*

(Continued)

*Primary Examiner* — Kari L Schmidt
(74) *Attorney, Agent, or Firm* — Jackson Walker L.L.P.

(57)    ABSTRACT

Disclosed systems and methods for securing an information handling system monitor for certain predetermined events, and, upon detecting any one of the predetermined events, requesting ownership data indicative of the authorized or recognized owner. In some embodiments, the ownership data is conveyed via a digital certificate establishing a trusted relationship between the owner and the information handling system. The digital certificate cryptographically associates a manifest of the system's key components and a device identifier such as a service tag. The predetermined requests and events may include, as non-limiting examples, requests to wipe, clear, or sanitize a persistent storage resource, request to change an encryption key, chassis intrusion events, requests to modify an OS image of a platform, requests to modify a security parameter, requests to modify or restore a factory setting of a configuration parameter, incorrect password events exceeding a predetermined threshold, and SPI probe detection events.

18 Claims, 4 Drawing Sheets

(56)                  References Cited

U.S. PATENT DOCUMENTS

| | | | | |
|---|---|---|---|---|
| 2017/0250814 A1* | 8/2017 | Brickell | ............... | H04W 12/37 |
| 2019/0340364 A1* | 11/2019 | Liu | ....................... | H04L 9/0894 |
| 2020/0314123 A1* | 10/2020 | Staab | ................... | G06F 21/554 |
| 2020/0327231 A1* | 10/2020 | Smith | .................... | G06F 21/33 |
| 2021/0081543 A1* | 3/2021 | Ferreira | ............... | G06F 21/552 |
| 2022/0083016 A1* | 3/2022 | Kwatra | ............... | G05B 19/042 |
| 2023/0010345 A1* | 1/2023 | Khatri | ..................... | G09C 1/00 |
| 2023/0045867 A1* | 2/2023 | Mandal | ................ | H04L 9/3247 |
| 2023/0344648 A1* | 10/2023 | Goodman | ............. | H04L 9/0897 |
| 2023/0370454 A1* | 11/2023 | Mohammed | ........ | H04L 63/0876 |
| 2023/0401318 A1* | 12/2023 | Dong | ................... | G06F 21/575 |
| 2024/0086205 A1* | 3/2024 | Haddad | ................ | G06F 21/575 |
| 2024/0333706 A1* | 10/2024 | Mohammed | .......... | H04L 63/102 |

OTHER PUBLICATIONS

W. Alsabbagh and P. Langendörfer, "Security of Programmable Logic Controllers and Related Systems: Today and Tomorrow," in IEEE Open Journal of the Industrial Electronics Society, vol. 4, pp. 659-693, 2023. (Year: 2023).*

C. Jin, S. Valizadeh and M. van Dijk, "Snapshotter: Lightweight intrusion detection and prevention system for industrial control systems," 2018 IEEE Industrial Cyber-Physical Systems (ICPS), St. Petersburg, Russia, 2018, pp. 824-829. (Year: 2018).*

* cited by examiner

400

401 — CPU(S)
410 — MEMORY
420 — I/O HUB
460 — EC
440 — NETWORK I/F
450 — I/O DEVICE(S)
430 — STORAGE

BIOS METHOD FOR SECURING AND PROTECTING END POINT WITH OWNERSHIP INFORMATION

TECHNICAL FIELD

Disclosed subject matter pertains to information handling system security and, more specifically, preventing users of lost or stolen systems from accessing and modifying data stored on the system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system, e.g., a laptop, notebook, desktop, tablet, server, etc., that is lost or stolen generally results in a stressful, costly, and time-consuming inconvenience for the owner or authorized user and may create a significant threat to the authorized user's digital security. An unauthorized user of a lost or stolen system may be able to access persistent storage to wipe an image of the system's authorized operating system (OS) and install a new OS image. Critical and sensitive information stored on lost and stolen systems is likewise vulnerable.

SUMMARY

Security issues associated with lost or stolen information handling systems are addressed by resources and features disclosed herein. Disclosed systems may enable and support telemetry-based features for authenticating or otherwise confirming that data-altering requests originate from a registered or otherwise authorized user of the information handling system. Disclosed features combat known system tampering and system attacking approaches, including approaches in which the entry point begins at a BIOS feature-management interface. Prevention and remediation efforts in existing platforms have been generally limited to BIOS Admin password controls. Subject matter disclosed herein enables device owner verification, notification, logging, and authorization control for BIOS requests, i.e., requests initiated via a BIOS setup user interface. Disclosed subject matter may implement and enforce user authorization for BIOS requests including, as examples, requests to wipe, clear, and/or sanitize a system. Disclosed features may also implement and support monitoring, during serial peripheral interface (SPI) probing or chassis intrusion, suspicious events, e.g., hard disk drive (HDD) password entry failures, and notify the registered or authorized user at the time of the event.

Disclosed subject matter is beneficial in a variety of scenarios. As an example, when a system has been stolen, one of the first things an unauthorized user is likely to do is to wipe, clean, and/or sanitize the device. In contrast to conventional systems, disclosed systems may be configured to require authorization from the owner of record prior to performing any such actions. As a second example, while conventional systems do not monitor SPI probing or chassis intrusions, features disclosed herein may notify an owner of record and/or challenge the user in response to detecting these types of activities.

In at least one aspect, disclosed systems and methods for preserving or securing an information handling system monitor for certain predetermined events, and, upon detecting any one of the predetermined events, request ownership data indicative of the authorized or recognized user, referred to herein simply as the owner for the information handling system. In some embodiments, the ownership data is conveyed via a digital certificate establishing a trusted relationship between the owner and the information handling system. The digital certificate cryptographically associates a manifest of the system's key components and a device identifier such as a service tag.

The predetermined requests and events may include, as non-limiting examples, requests to wipe, clear, or sanitize a persistent storage resource, request to change an encryption key, chassis intrusion events, requests to modify an operating system (OS) image of a platform, requests to modify a security parameter, requests to modify or restore a factory setting of a configuration parameter, incorrect password events exceeding a predetermined threshold, and SPI probe detection events.

Responsive to receiving the ownership information, a user of the information handling system may be prompted to verify owner information. Execution of any of a group of irreparable operations is prohibited until the user successfully verifies the owner information.

In some embodiments, requesting the ownership data may include requesting the ownership data from an embedded controller of the information handling system. In other embodiments, requesting the ownership data is implemented within an encrypted ownership voucher and wherein requesting the ownership data comprises verifying the ownership voucher via a trusted connection with an original equipment manufacturer (OEM) database.

If attempts to obtain the ownership information are unsuccessful, backend verification operations may be performed wherein the backend verification operations may include: establishing basic input/output system (BIOS) connectivity enabling network access in a pre-OS environment, communicating the event and a device identifier associated with the information handling system to an OEM backend platform, responsive to locating and retrieving owner information associated with the device identifier, communicating a request prompting the owner to authenticate; and responsive to not locating ownership information associated with the device identifier, prompting the user to register. Upon receiving a response from the backend platform, the response may be processed by a state machine module to take a state machine action. In at least some embodiments, the state machine actions include: proceeding with the irreparable operation, prohibiting the irreparable operation, prompting the user to register the information handling system with the OEM, and prompting the user to retry.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
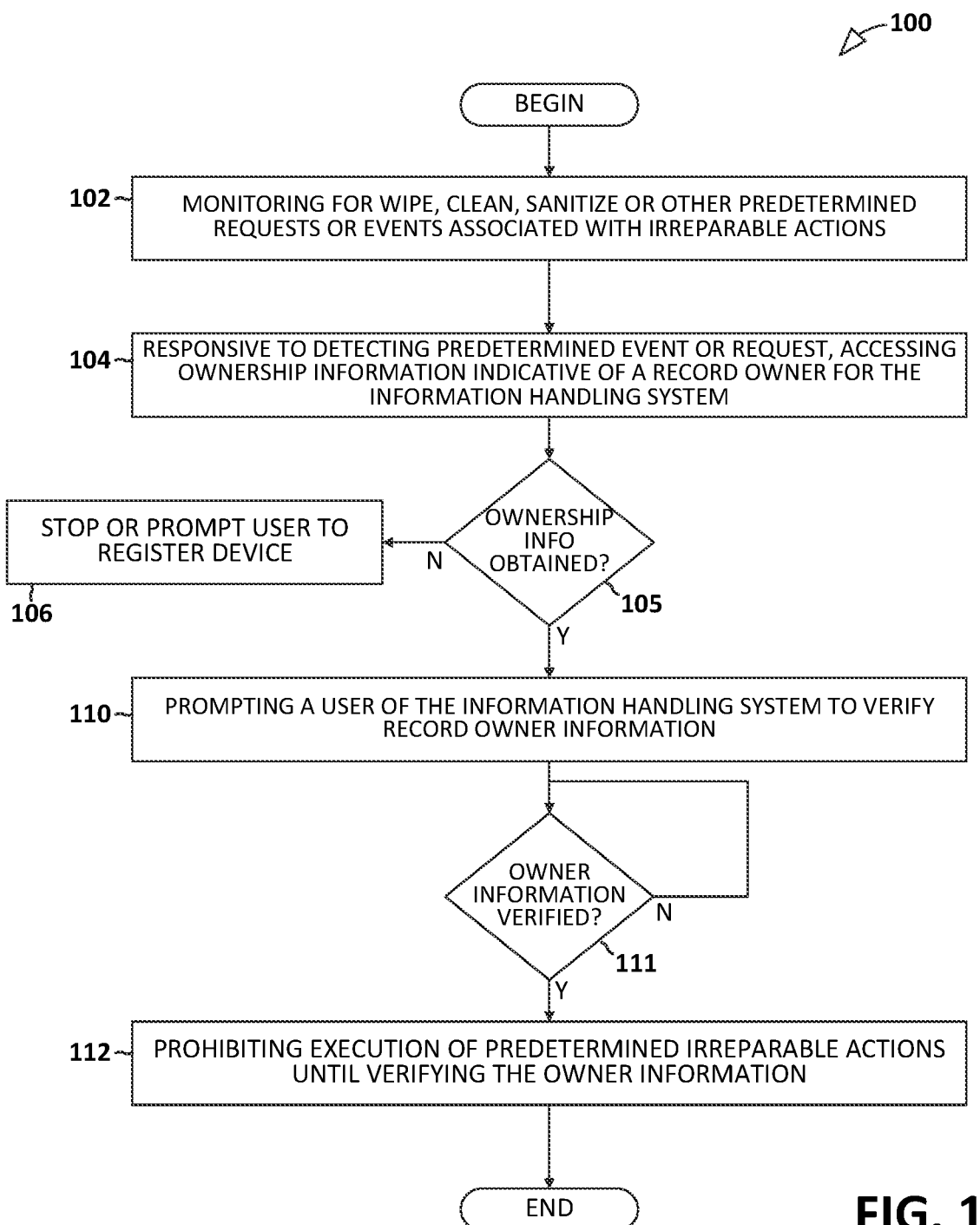
FIG. 1 illustrates a method for collecting and utilizing ownership information.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a method 100 for collecting and utilizing ownership information to secure an information handling system against unauthorized and potentially irreparable actions. The method depicted in FIG. 1 begins with monitoring (operation 102) an information handling system, referred to simply as a platform for the sake of brevity, for any one of a number of predetermined requests or events. The predetermined requests or events may include requests or events associated with irreparable actions including, as non-limiting examples, requests to wipe, clean, or sanitize data and/or instructions stored in one or more storage resources of the system. The stored data and/or instructions may include, as an illustrative example, an OS image for the platform. The predetermined requests or events may include requests or events that occur while the system is in a pre-OS state, i.e., a state of the platform prior to loading a platform OS.

Responsive to detecting any of the predetermined requests or events, the method 100 depicted in FIG. 1 attempts to retrieve, access, or otherwise obtain (operation 104) ownership information, including owner-identifying information, indicative of an identity of the platform owner, as well as additional information regarding the owner including, for example, contact information for the owner.

Ownership information may be obtained from local or remote storage. In at least one embodiment, the platform includes an embedded controller (EC) and the ownership information is obtained from the embedded controller.

If, as determined in operation 105, the platform is unable to obtain ownership information, method 100 may stop or prompt (106) the user to register the platform with the platform's OEM. If ownership information is successfully obtained, method 100 may then prompt (operation 110) a user of the platform to verify one or more items of owner information, including, as examples, contact information, owner preferences information, and so forth. Until the platform user successfully verifies owner information, as determined in operation 111, method 100 may prohibit (operation 112) execution of any one or more predetermined actions or operations, including, as an illustrative example, operations to wipe, clean, and sanitize an image of the platform OS.

Figure 2:
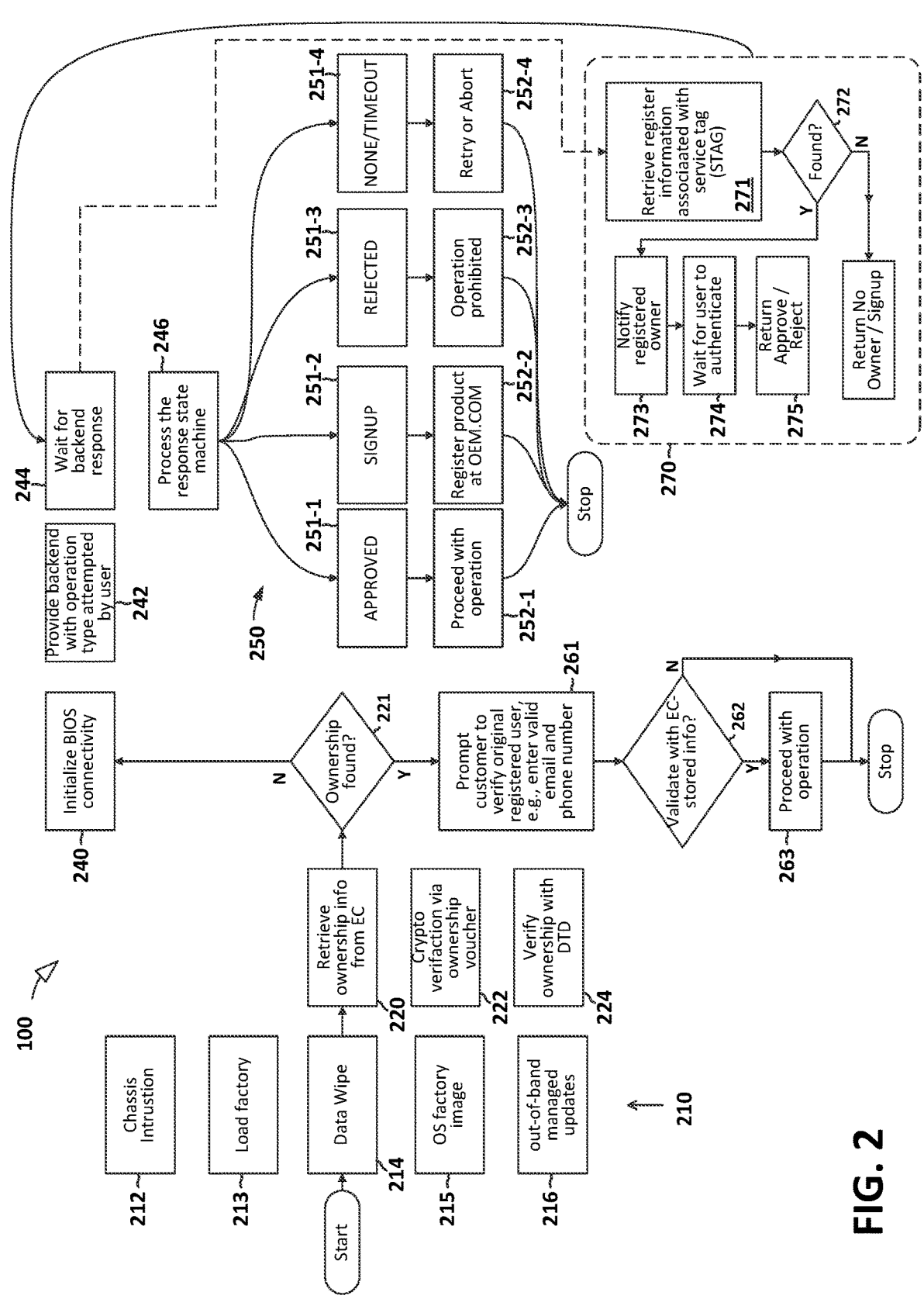
FIG. 2 is a detailed flow diagram of an exemplary implementation of the method of FIG. 1.

Referring now to FIG. 2, a detailed flow diagram illustrates an exemplary implementation of the method 100. As depicted in FIG. 2, method 100 monitors for any of a group of predetermined requests/events 210. The predetermined requests/events 210 illustrated in FIG. 2 include a chassis intrusion event 212, a request or attempt to load one or more factory settings 213, a data wipe request 214, a request to wipe, modify, or restore 215 a factory OS image, or a request to perform out-of-band managed updates 216. The predetermined events illustrated in FIG. 2 are exemplary and other implementations may monitor for more, fewer, and/or different predetermined events, whether associated with irreparable activity or not.

Upon detecting a predetermined request or event, the method 100 depicted in FIG. 2 attempts to retrieve (220) ownership information from the platform embedded controller (EC). In at least some embodiments, ownership information retrieved from the EC may be cryptographically verified (222) against an ownership voucher stored on the platform or verified (224) against ownership information stored in a backend database maintained by the OEM or another entity.

If the attempt to retrieve ownership information is unsuccessful, the method 100 of FIG. 2 may attempt to confirm the user's authority by accessing OEM backend data for the platform. The method 100 depicted in FIG. 2 supports an implementation in which the predetermined action is detected while the platform is in a pre-OS state. In this scenario, method 100 may access and communicate with the OEM backend by establishing BIOS connectivity (240), i.e., network connectivity established in a pre-OS state. The type of operation attempted by the platform user is communicated (242) to the OEM backend, after which the platform may await (244) a response from the backend.

The OEM backend 270 illustrated in FIG. 2 retrieves (271) OEM device register information associated with the platform based, for example, on an OEM service tag or other device identification information. If (272) the service is found in the register, the platform user may be notified (273) and prompted to authenticate the user's ownership interest. Upon resolution of user authentication (274), the platform may be instructed to return, approve, or reject (275) the applicable predetermined request or event.

The response from the OEM backend, when received by the platform, may then be processed (246) via a state machine 250 to determine the platform subsequent action. The state machine 250 illustrated in FIG. 2 resolves the backend response into one of four states, 251-1 through 251-4, including an approved state 251-1 that permits the platform to proceed (252-1) with the predetermined request, a sign up state 251-2 that prompts (252-2) the platform user to register the platform with an OEM database, a rejected state 251-3 that prohibits (252-3) the platform from proceeding, and a timeout/retry action 251-4 that may retry (252-4) the attempt to communicate with the OEM backend or abort.

If ownership information is successfully found in block 221, the illustrated method prompts (261) the platform user to verify one or more items of owner information including, as non-limiting examples, valid email address and phone number. If (block 262), the verification is successful, the platform proceeds (263) with the predetermined request.

Figure 3:
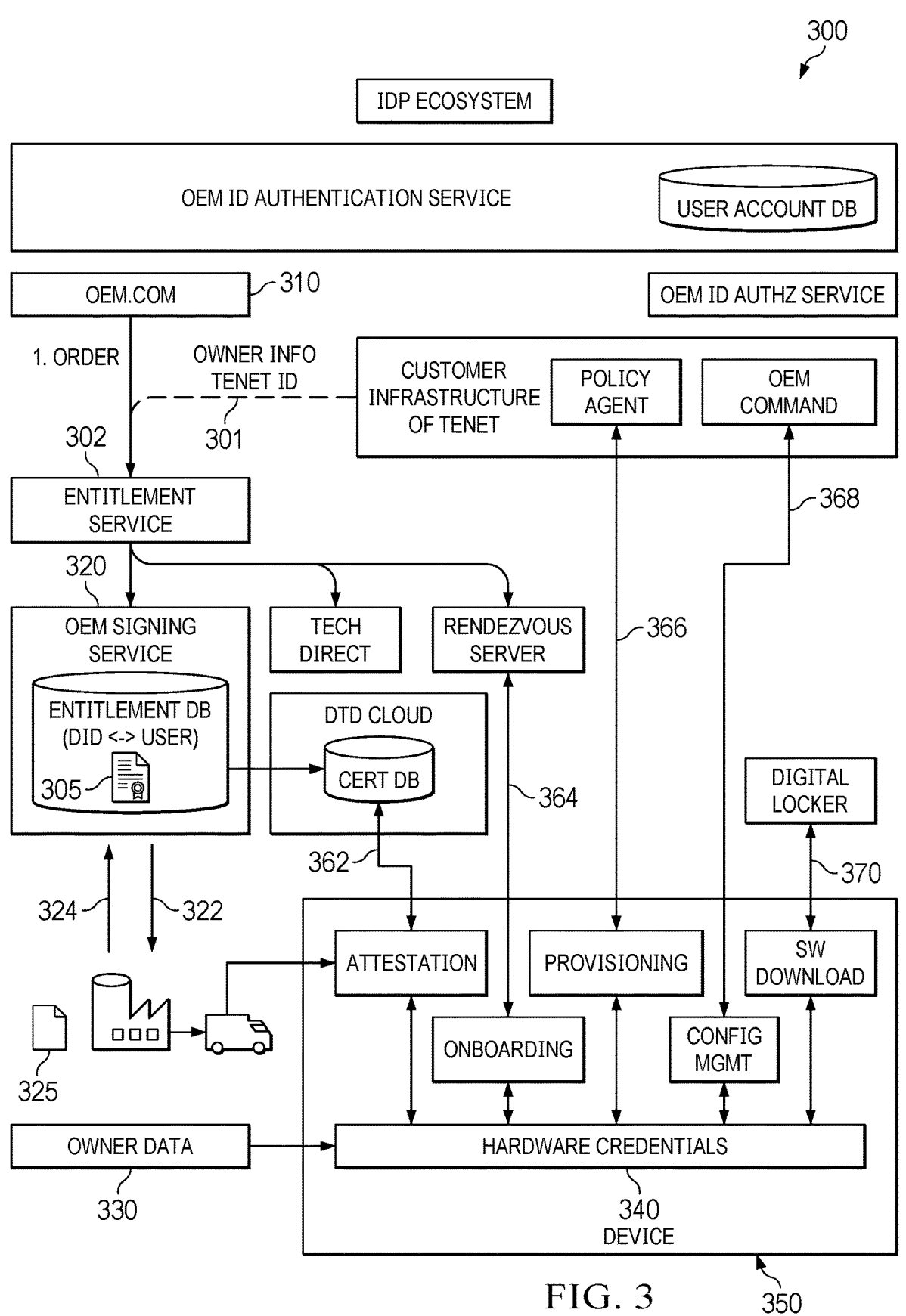
FIG. 3 illustrates exemplary resources and operations for obtaining and maintaining ownership information.

Referring now to FIG. 3, exemplary resources 300 and operations for obtaining and maintaining ownership information are depicted. As depicted in FIG. 3, the owner of a system provides (301) owner information including, as examples, contact information, profile information, customer tenet information, and so forth, to an entitlement service 302 maintained by the OEM 310. After building (322) the applicable platform, the OEM may generate 324 a certificate 305 via secured component verification (SCV) services for cryptographically associating a manifest 325 of the platform's key components with a service tag or other device identifier.

As depicted in FIG. 3, owner data (330) is incorporated into hardware credentials 340 for the platform 350 and may be used for attestation 362, onboarding 364, provisioning 366, configuration management 368 and software downloading 370.

Figure 4:
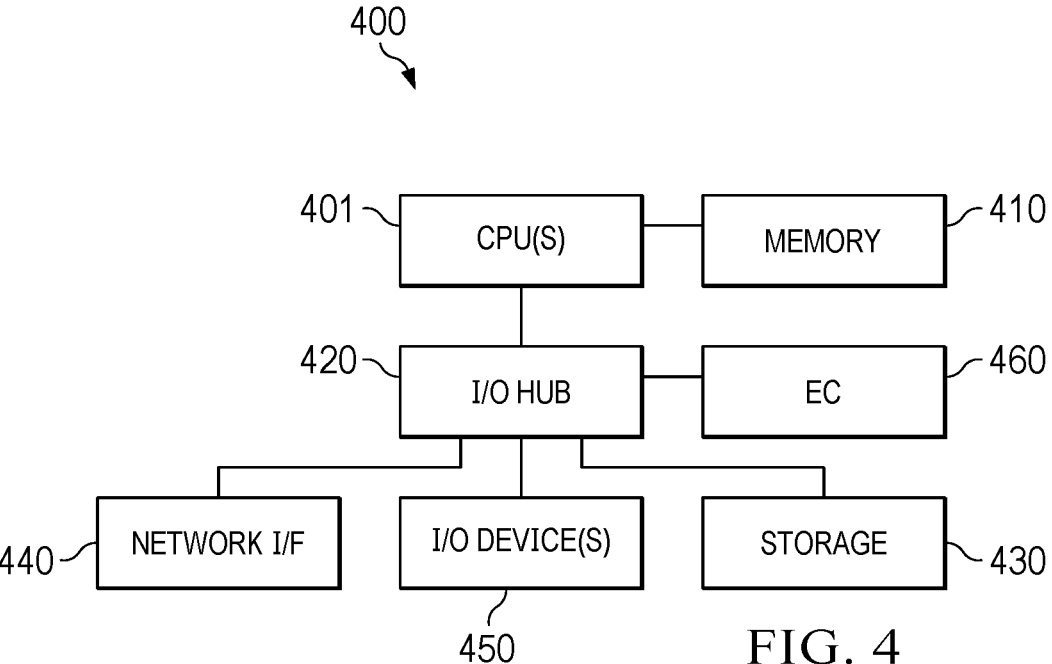
FIG. 4 illustrates an information handling system suitable for use in conjunction with features disclosed in FIGS. 1-3.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes an embedded controller EC 460 may provide or support various system management functions and, in at least some implementations, keyboard controller functions. Exemplary system management function that may be supported by EC 460 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 460 may support battery management features to control charging of the battery in addition to switching between the battery and AC adapter as the active power source changes or monitoring the various battery status metrics such as temperature, charge level and overall health. EC 460 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing an information handling system, the method comprising:

responsive to detecting any of a group of suspicious events, requesting ownership information indicative of an owner of an information handling system;

responsive to receiving the ownership data, prompting a user of the information handling system to verify owner information; and' prohibiting execution of any of a group of irreparable operations until the user successfully verifies the owner information;

wherein the information handling system includes an embedded controller (EC) to support one or more system management functions selected from: thermal management, power monitoring, and battery management and wherein requesting the ownership information comprises requesting the ownership information from-the EC.

2. The method of claim 1, wherein the ownership information comprises an encrypted ownership voucher and wherein requesting the ownership data includes verifying the ownership voucher via a trusted connection with an original equipment manufacturer (OEM) database.

3. The method of claim 1, wherein the group of suspicious events includes user requests initiated in a pre-operating system (OS) environment.

4. The method of claim 3, wherein the group of suspicious events includes user requests initiated from a basic input/output (BIOS) setup interface.

5. The method of claim 1, wherein the group of suspicious events includes an event selected from:

a chassis intrusion event;

incorrect password events exceeding a predetermined threshold; and a serial peripheral interface (SPI) probe detection event.

6. The method of claim 1, wherein the ownership information comprises a digital certificate establishing a trusted relationship between the owner and the information handling system platform.

7. The method of claim 1, wherein the group of irreparable operations include a request to wipe, clear, or sanitize a persistent storage resource.

8. A method for preserving an information handling system platform, the method comprising:

responsive to detecting any of a group of suspicious events, requesting ownership data indicative of an owner for the information handling system;

responsive to receiving the ownership data, prompting a user of the information handling system platform to verify the owner data; and' prohibiting execution of any of a group of irreparable operations until the user successfully verifies the owner data;

responsive to not receiving the owner information, performing backend verification operations including:

establishing BIOS connectivity enabling network access in a pre-OS environment;

communicating the suspicious event and a device identifier associated with the information handling system platform to an OEM backend platform;

responsive to locating and retrieving owner information associated with the device identifier, communicating a request prompting the owner to authenticate; and responsive to not locating owner information associated with the device identifier, prompting the user to register.

9. The method of claim 8, further comprising:

returning a response from the backend platform; and processing the response to take an action selected from:

proceeding with the irreparable operation;

prohibiting the irreparable operation;

prompting the user to register the information handling system with the OEM; and prompting the user to retry.

10. An information handling system, comprising:

a central processing unit (CPU);

an embedded controller (EC) to support one or more system management functions selected from: thermal management, power monitoring, and battery management, coupled to the CPU; and computer readable storage including processor executable instructions that, when executed by a processor, cause the system to perform operations including:

responsive to detecting any of a group of suspicious events, requesting ownership information indicative of an owner for the information handling system platform;

responsive to receiving the ownership information:

prompting a user of the information handling system platform to verify owner information; and prohibiting execution of any of a group of irreparable operations until the user successfully verifies the owner information;

responsive to not receiving the owner information, performing backend verification operations including:

establishing BIOS connectivity enabling network access in a pre-OS environment;

communicating the event and a device identifier associated with the information handling system to an OEM backend platform;

responsive to locating and retrieving owner information associated with the device identifier, communicating a request prompting the owner to authenticate; and responsive to not locating owner information associated with the device identifier, prompting the user to register.

11. The information handling system of claim 10, wherein requesting the ownership information comprises requesting the ownership information from EC.

12. The information handling system of claim 10, wherein the ownership information comprises an encrypted ownership voucher and wherein requesting the ownership data includes verifying the ownership voucher with via a trusted connection with an original equipment manufacturer (OEM) database.

13. The information handling system of claim 10, wherein the plurality of predetermined events includes user requests initiated in a pre-operating system (OS) environment.

14. The information handling system of claim 13, wherein the group of suspicious events include user requests initiated from a basic input/output system (BIOS) setup interface.

15. The information handling system of claim 10, wherein the group of group of suspicious includes an event selected from:

a chassis intrusion event;

incorrect password events exceeding a predetermined threshold; and a serial peripheral interface (SPI) probe detection event.

16. The information handling system of claim 10, wherein the ownership information comprises a digital certificate establishing a trusted relationship between the owner and the information handling system.

17. The information handling system of claim 10, further comprising:

returning a response from the backend platform; and processing the response to take an action selected from:

proceeding with the irreparable operation;

prohibiting the irreparable operation;

prompting the user to register the information handling system platform with the OEM; and prompting the user to retry.

18. The information handling system of claim 10, wherein the group of irreparable operations include a request to wipe, clear, or sanitize a persistent storage resource.

* * * * *